US012559394B2

(12) United States Patent
Tkachenko

(10) Patent No.: US 12,559,394 B2
(45) Date of Patent: Feb. 24, 2026

(54) MAGNETIC TREATMENT OF DRINKING WATER BY HYDROMAGNETIC RESONATORS WITH PERMANENT MAGNETS CONTAINED THEREIN

(71) Applicant: Yury Tkachenko, Palo Alto, CA (US)

(72) Inventor: Yury Tkachenko, Palo Alto, CA (US)

(73) Assignee: NEAU Brands, Inc., Palo Alto, CA (US)

( * ) Notice: Subject to any disclaimer, the term of this patent is extended or adjusted under 35 U.S.C. 154(b) by 589 days.

(21) Appl. No.: 17/904,868

(22) PCT Filed: Feb. 24, 2021

(86) PCT No.: PCT/US2021/019460
§ 371 (c)(1),
(2) Date: Aug. 23, 2022

(87) PCT Pub. No.: WO2021/173705
PCT Pub. Date: Sep. 2, 2021

(65) Prior Publication Data
US 2023/0112773 A1      Apr. 13, 2023

Related U.S. Application Data

(60) Provisional application No. 63/038,250, filed on Jun. 12, 2020, provisional application No. 62/981,227, filed on Feb. 25, 2020.

(51) Int. Cl.
*C02F 1/48* (2023.01)
*A23L 2/54* (2006.01)
(Continued)

(52) U.S. Cl.
CPC ................ *C02F 1/482* (2013.01); *A23L 2/54* (2013.01); *A23L 2/56* (2013.01); *C02F 1/005* (2013.01);
(Continued)

(58) Field of Classification Search
CPC .. C02F 1/482; C02F 1/481; C02F 1/68; C02F 1/005; C02F 1/20; C02F 2103/02;
(Continued)

(56) References Cited

U.S. PATENT DOCUMENTS

| | | | | |
|---|---|---|---|---|
| 3,951,807 | A | * | 4/1976 | Sanderson .............. B03C 1/023 210/222 |
| 4,299,700 | A | * | 11/1981 | Sanderson .............. C02F 1/481 210/222 |

(Continued)

FOREIGN PATENT DOCUMENTS

| | | |
|---|---|---|
| WO | 2016178170 A1 | 11/2016 |
| WO | 2019138352 A1 | 7/2019 |

OTHER PUBLICATIONS

International Search Report and Written Opinion mailed May 6, 2021 for International Patent Application No. PCT/US21/19460, 14 pages.

*Primary Examiner* — Minh Q Le
(74) *Attorney, Agent, or Firm* — Shay Glenn LLP

(57) ABSTRACT

Introduced here are treatment systems and associated processes for treating water using magnetic fields. A treatment system can comprise a hydromagnetic resonator that creates the magnetic fields through which water can be directed. A hydromagnetic resonator can include at least one expansion chamber that provides a tortuous path along which water is able to flow through a magnetic field created by an arrangement of permanent magnets and at least one convergent-divergent nozzle designed to accelerate the flow of water passing through a throat segment. Water directed through a hydromagnetic resonator will be magnetically treated while flowing through the magnetic field created by the arrangement of permanent magnets within each expansion chamber (Continued)

350  358
Expansion Chamber 352a
Convergent-Divergent Nozzle 354a
Expansion Chamber 352b
Structural Body 362
Convergent-Divergent Nozzle 354n
Expansion Chamber 352n
Gas Separation Component 356
360 and then pressurized while flowing through the throat segment of each convergent-divergent nozzle.

11 Claims, 11 Drawing Sheets

(51) Int. Cl.

| | |
|---|---|
| *A23L 2/56* | (2006.01) |
| *C02F 1/00* | (2023.01) |
| *C02F 1/20* | (2023.01) |
| *C02F 1/68* | (2023.01) |
| *C02F 103/02* | (2006.01) |

(52) U.S. Cl.
CPC ................ *C02F 1/20* (2013.01); *C02F 1/481* (2013.01); *C02F 1/68* (2013.01); *C02F 2103/02* (2013.01); *C02F 2201/48* (2013.01); *C02F 2301/028* (2013.01); *C02F 2301/06* (2013.01); *C02F 2301/08* (2013.01)

(58) Field of Classification Search
CPC ............. C02F 2201/48; C02F 2301/08; C02F 2301/028; C02F 2301/06; A23L 2/54; A23L 2/56
USPC ........................................................ 137/803
See application file for complete search history.

(56) References Cited

U.S. PATENT DOCUMENTS

| | | | | |
|---|---|---|---|---|
| 4,430,785 | A | * | 2/1984 | Sanderson ........... F02M 27/045 |
| | | | | 29/890.141 |
| 4,611,615 | A | * | 9/1986 | Petrovic ................. F16L 55/24 |
| | | | | 210/695 |
| 4,716,024 | A | * | 12/1987 | Pera ..................... F02M 27/045 |
| | | | | 422/186.01 |
| 5,378,362 | A | | 1/1995 | Schoepe |
| 5,866,010 | A | * | 2/1999 | Bogatin ................. C02F 1/482 |
| | | | | 210/695 |
| 2003/0168393 | A1 | * | 9/2003 | Tsunematsu ........... C02F 1/481 |
| | | | | 210/243 |
| 2007/0151912 | A1 | * | 7/2007 | Park ........................ C02F 1/481 |
| | | | | 210/222 |
| 2009/0159523 | A1 | | 6/2009 | McCutchen |
| 2016/0115049 | A1 | * | 4/2016 | Vo ............................ C02F 1/482 |
| | | | | 210/222 |
| 2016/0220922 | A1 | | 8/2016 | Kamen et al. |
| 2017/0197850 | A1 | * | 7/2017 | Hebert ................... B03C 1/288 |
| 2018/0068515 | A1 | | 3/2018 | Edwards et al. |
| 2020/0107563 | A1 | * | 4/2020 | Alvarez Lhabriel .... C12H 1/16 |
| 2021/0221712 | A1 | * | 7/2021 | Su ......................... H01F 7/0278 |
| 2021/0230026 | A1 | * | 7/2021 | Alhseinat ................. B03C 5/02 |
| 2022/0073384 | A1 | * | 3/2022 | Byun ...................... C02F 1/482 |
| 2022/0184569 | A1 | * | 6/2022 | Varone ................... C12H 1/165 |
| 2022/0219099 | A1 | * | 7/2022 | Seguin ..................... B03D 1/02 |
| 2025/0256994 | A1 | * | 8/2025 | Muñoz García ...... C02F 1/5236 |

* cited by examiner

600b
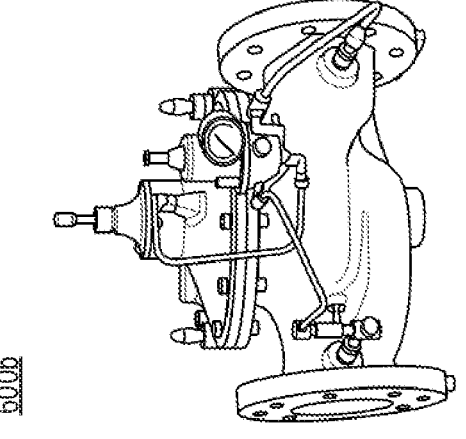
600a
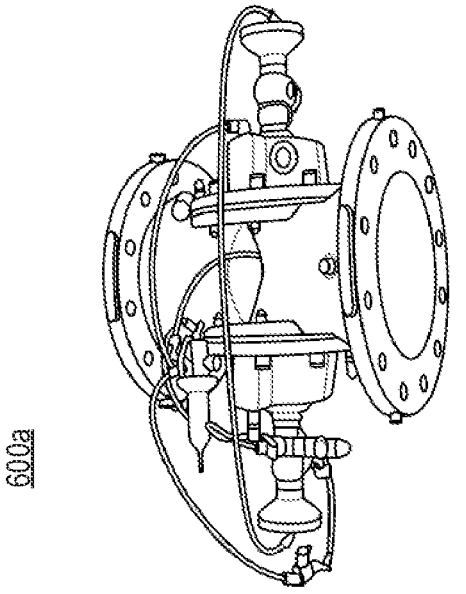
FIGURE 6

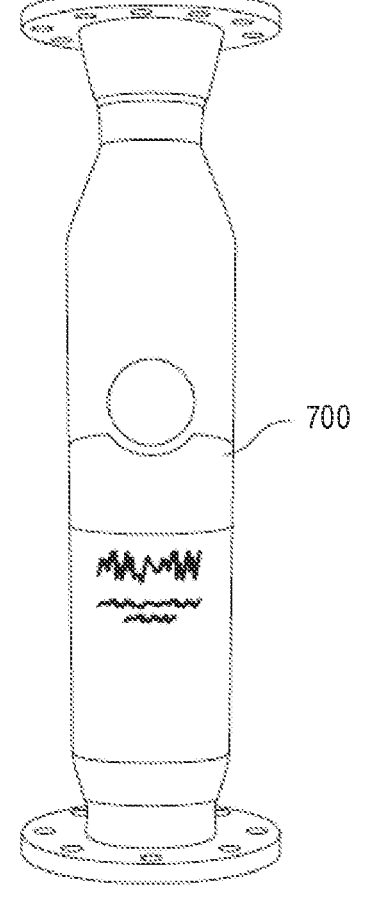
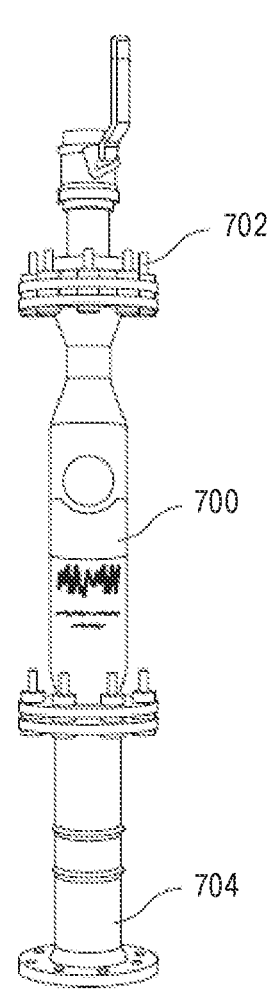
FIGURE 7A          FIGURE 7B

Figure 10:
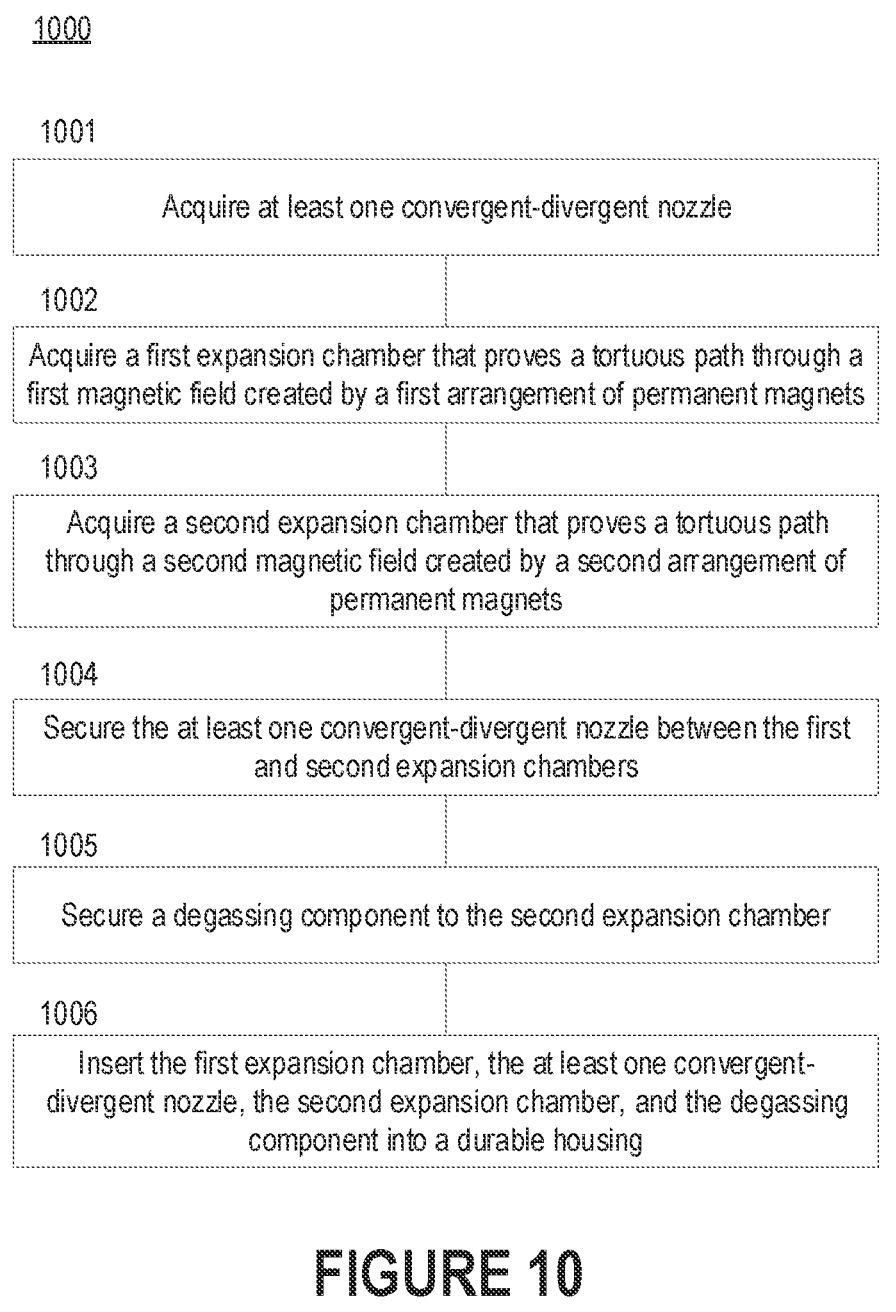

1000

1001

Acquire at least one convergent-divergent nozzle

1002

Acquire a first expansion chamber that proves a tortuous path through a first magnetic field created by a first arrangement of permanent magnets

1003

Acquire a second expansion chamber that proves a tortuous path through a second magnetic field created by a second arrangement of permanent magnets

1004

Secure the at least one convergent-divergent nozzle between the first and second expansion chambers

1005

Secure a degassing component to the second expansion chamber

1006

Insert the first expansion chamber, the at least one convergent-divergent nozzle, the second expansion chamber, and the degassing component into a durable housing

Obtain a hydromagnetic resonator

1102

Direct a volume of water through the hydromagnetic resonator

1103

Supply a series of containers

1104

Fill each container in the series of containers with a portion of the volume of water

1105

Affix a lid to each container in the series of containers

Hydrogen (H⁺)
Oxygen (OH⁻)
H₂O

☆ —— Pollutants
✗ —— Chlorine (Cl₂)

Treated Water         Untreated Water

Full Hydration         Partial Hydration

MAGNETIC TREATMENT OF DRINKING WATER BY HYDROMAGNETIC RESONATORS WITH PERMANENT MAGNETS CONTAINED THEREIN

CROSS-REFERENCE TO RELATED APPLICATIONS

This application is a national stage entry of International Application No. PCT/US21/19460, titled "Magnetic Treatment of Drinking Water by Hydromagnetic Resonators with Permanent Magnets Contained Therein" and filed Feb. 24, 2021, which claims priority to U.S. Provisional Application No. 62/981,227, titled "Magnetic Treatment of Drinking Water with Permanent Magnets" and filed on Feb. 25, 2020, and U.S. Provisional Application No. 63/038,250, titled "Magnetic Treatment of Water with Hydromagnetic Resonators" and filed on Jun. 12, 2020, each of which is incorporated by reference in its entirety.

TECHNICAL FIELD

Various embodiments of the present disclosure concern systems designed to treat water using magnetic fields and associated processes.

BACKGROUND

Water is an inorganic compound that is a tasteless, odorless, and nearly colorless liquid at room temperature. Generally described as the "universal solvent," water is the most abundant substance on Earth. Water is the liquid form of a molecule consisting of a single oxygen atom bonded to a pair of hydrogen atoms whose chemical formula is $H_2O$. The bonds between these atoms are polar covalent due to the higher electronegativity of the oxygen atom, and thus may be referred to as "covalent bonds" or "polar bonds." Because the oxygen atom attracts the shared electrons of the covalent bonds to a greater extent than the hydrogen atoms, the oxygen atom acquires a partial negative charge while the hydrogen atoms acquire partial positive charges. As shown in FIG. 1, the two lone pairs of electrons on the oxygen atom cause the molecule to have a bent structure. Because the covalent bonds do not cancel one another, the molecule as a whole is polar.

Polar molecules attract one another by dipole-dipole forces as the positive end of one molecule is attracted to the negative end of another nearby molecule. In the case of water, each hydrogen atom will normally be strongly attracted to a lone pair of electrons on a nearby oxygen atom. These bonds (referred to as "hydrogen bonds") are responsible for several unique properties of water, such as having a solid form that is less dense than its liquid form, a relatively high boiling point for its molar mass, and a high heat capacity.

BRIEF DESCRIPTION OF THE DRAWINGS

FIG. 6 depicts several examples of degassing components (also referred to as "gas separation components") able to remove at least some gas from the water as it travels through a hydromagnetic resonator.

FIG. 7A depicts an example of a hydromagnetic resonator having a narrow form.

FIG. 7B illustrates how the hydromagnetic resonator of FIG. 7A may be connected between an ingress pipe through which untreated water is received and an egress pipe through which treated water is ejected.

FIG. 10 depicts a flow diagram of a process for constructing a hydromagnetic resonator designed to magnetically treat fluid flowing therethrough.

Figure 1:
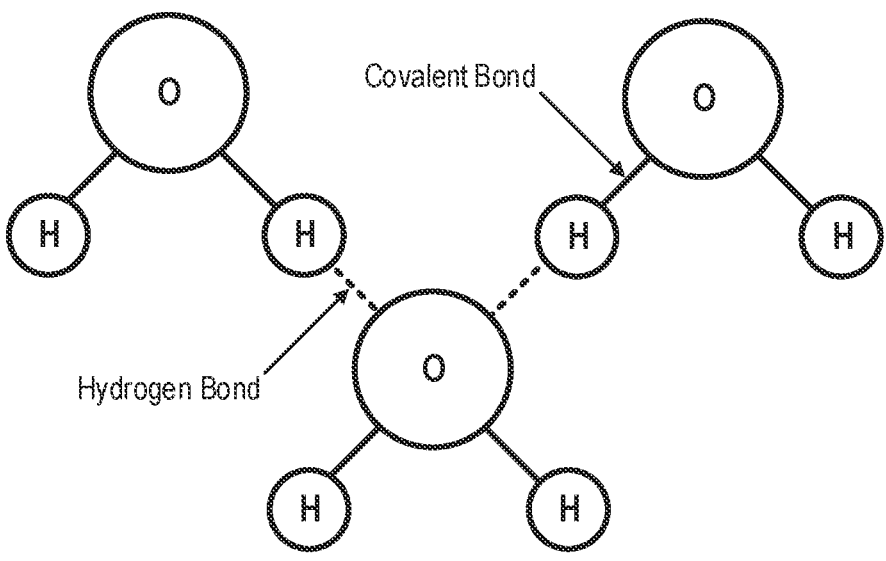
FIG. 1 illustrates how the two lone pairs of electrons on an oxygen atom cause a water molecule to have a bent structure.

Various features of the technology described herein will become more apparent to those skilled in the art from a study of the Detailed Description in conjunction with the drawings. Embodiments are illustrated by way of example and not limitation in the drawings. Accordingly, while embodiments have been shown in the drawings for the purpose of illustration, those skilled in the art will recognize that alternative embodiments may be employed without departing from the principles of the technology.

DETAILED DESCRIPTION

Charged particles that are present in a fluid will be acted upon if the fluid moves in a magnetic field. The Lorentz force (also referred to as the "electromagnetic force") is the combination of magnetic forces that acts on each of these charged particles. A charged particle moving with velocity in a magnetic field will experience a Lorentz force of:

$$F = qV \times B, \quad \text{Eq. 1}$$

where q is the electric charge of the particle, V is the velocity vector of the particle, and B is the induction vector of the magnetic field. The Lorentz force is perpendicular to the motion of the charged particle and the direction of the magnetic field.

The trajectory of a charged particle in a magnetic field can be represented as follows:

$$\vec{F} = q[\vec{v} \times \vec{B}] = qvB \sin \alpha. \quad \text{Eq. 2}$$

Figure 2:
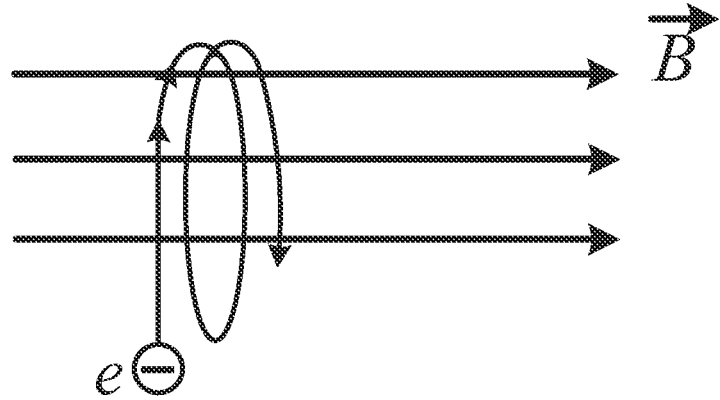
FIG. 2 illustrates how if a charged particle were to move in a magnetic field perpendicular to the direction of the induction vector, then the charged particle will move along a circular path.

As shown in FIG. 2, if a charged particle were to move in a magnetic field perpendicular to the direction of the induction vector, then the charged particle will move along a circular path. If the charged particle were to move at an angle with respect to the induction vector, then the charged particle will move along a spiral path. This may occur if, for example, the fluid conveying the charged particle is moving with respect to the induction vector. Note, however, that if the fluid conveying the charged particle is halted, then the magnetic field will no longer interact with the charged particle.

At certain values of velocity and induction, the structure of a fluid will change as it moves through a magnetic field due to the occurrence of phenomena such as phase transitions. These phenomena may be initiated by, for example, magnetostriction. Magnetostriction is a property of magnetic materials that causes them to change their shape, dimensions, or density during the process of magnetization. The variation of a given material's magnetization due to a magnetic field will change the magnetostrictive strain until reaching a saturation value.

Introduced here are treatment systems and associated processes for treating water using magnetic fields. By rearranging the larger clusters of molecules that are present in water into smaller (and more uniformly sized) clusters of molecules, the technology described herein exhibit several benefits. For example, decreasing the size of clusters of molecules may naturally promote adsorption—leading to improved hydration—without additives, chemicals, and the like. As another example, decreasing the size of clusters of molecules may lead to more efficient interactions on a molecular level.

A treatment system can comprise a hydromagnetic resonator (also referred to as a "hydromagnetic device" or "magnetic device") that creates the magnetic fields through which water can be directed. A hydromagnetic resonator can include at least one expansion chamber that provides a tortuous path along which water is able to flow through a magnetic field created by an arrangement of permanent magnets and at least one convergent-divergent nozzle designed to accelerate the flow of water passing through a throat segment. As further discussed below, water directed through a hydromagnetic resonator will be magnetically treated while flowing through the magnetic field created by the arrangement of permanent magnets within each expansion chamber and then pressurized while flowing through the throat segment of each convergent-divergent nozzle. In some embodiments, the hydromagnetic resonator includes a degassing component that is responsible for removing at least some gas (e.g., air) from the water prior to egress from the hydromagnetic resonator.

At a high level, water may be thought of as a solution comprised of electrically charged molecules that are arranged at random. These molecules interact with one another to form clusters of different sizes and compositions. Each molecule in a cluster will experience thermal motion, however. Consequently, there is a possibility that a given molecule will leave its cluster when its Coulomb force with respect to the nearest neighboring molecules is insignificant. For similar reasons, the Coulomb force may cause free molecules to join the nearest cluster. There is a dynamic equilibrium between clusters as molecules are constantly exchanged. Generally, each molecule will oscillate around its equilibrium position with a given frequency. If water is moved through an electromagnetic field, the resulting Lorentz force will tend to change the trajectory of the clusters of its molecules.

We'll start by changing the vector indicative of the Lorentz force with a certain frequency by tuning (i) the magnetic field and (ii) the velocity of a fluid (and thus the clusters of its molecules) as it travels through the magnetic field. As further discussed below, the velocity may be tuned based on a characteristic of the fluid. For instance, the velocity may be based on the viscosity or fluidity of the fluid, or the velocity may be based on the saturation of the fluid to various substances, minerals, etc. Thus, different fluids may be delivered through the magnetic field produced by a hydromagnetic resonator at different velocities.

When the frequency of an external force acting on a molecule is resonant to its natural frequency, the molecule will deviate from its equilibrium position by an amount that exceeds the critical distance. The term "critical distance" refers to the distance at which the force of an interaction will no longer keep the molecule in its cluster.

By tuning these parameters, the distribution and size of clusters in the fluid can be changed. Such action will alter the entropy (i.e., structure) of the fluid. Other thermophysical properties may also be altered as further discussed below. Thus, the structure of a fluid can be altered using a relatively small amount of energy provided by an arrangement of permanent magnets that create a magnetic field. This can be accomplished with a second-order phase transition (also referred to as a "second-kind phase transition") that alters the structure of the fluid without changing its aggregate state.

Terminoloqy

References in this description to "an embodiment," "one embodiment," or "some embodiments" means that the particular feature, function, structure, or characteristic being described is included in at least one embodiment. Occurrences of such phrases do not necessarily refer to the same embodiment, nor are they necessarily referring to alternative embodiments that are mutually exclusive of one another.

Unless the context clearly requires otherwise, the words "comprise," "comprising," and "comprised of" are to be construed in an inclusive sense rather than an exclusive or exhaustive sense (i.e., in the sense of "including but not limited to"). The term "based on" is also to be construed in an inclusive sense rather than an exclusive or exhaustive sense. Thus, unless otherwise noted, the term "based on" is intended to mean "based at least in part on."

When used in reference to a list of multiple items, the word "or" is intended to cover all of the following interpretations: any of the items in the list, all of the items in the list, and any combination of items in the list.

The sequences of steps performed in any of the processes described here are exemplary. However, unless contrary to physical possibility, the steps may be performed in various sequences and combinations. For example, steps could be added to, or removed from, the processes described here. Similarly, steps could be replaced or reordered. Thus, descriptions of any processes are intended to be open-ended.

Overview of Hydromaqnetic Resonator

Figure 3A:
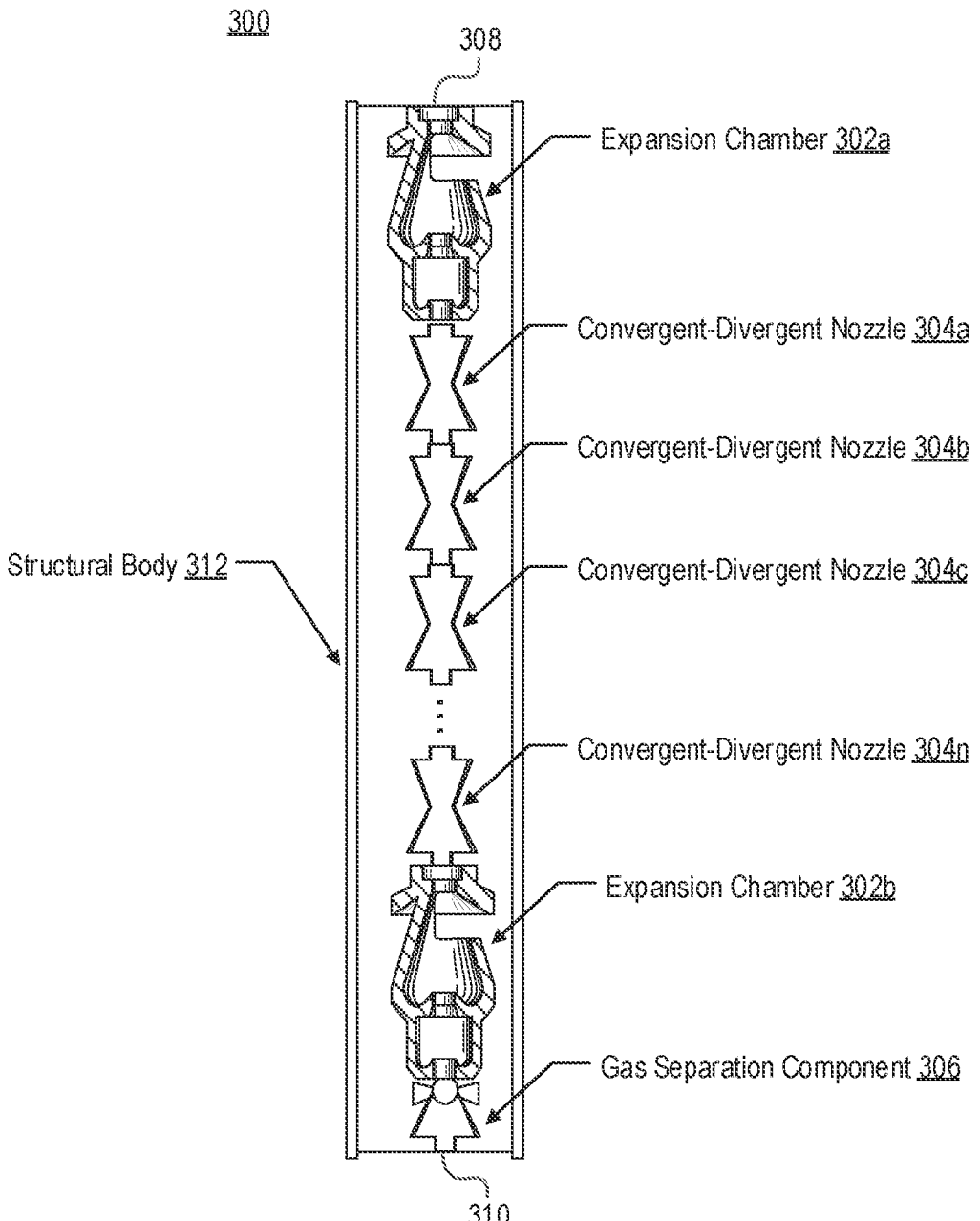
FIGS. 3A-B illustrate examples of hydromagnetic resonators that are capable of magnetically treating water.
Figure 3B:
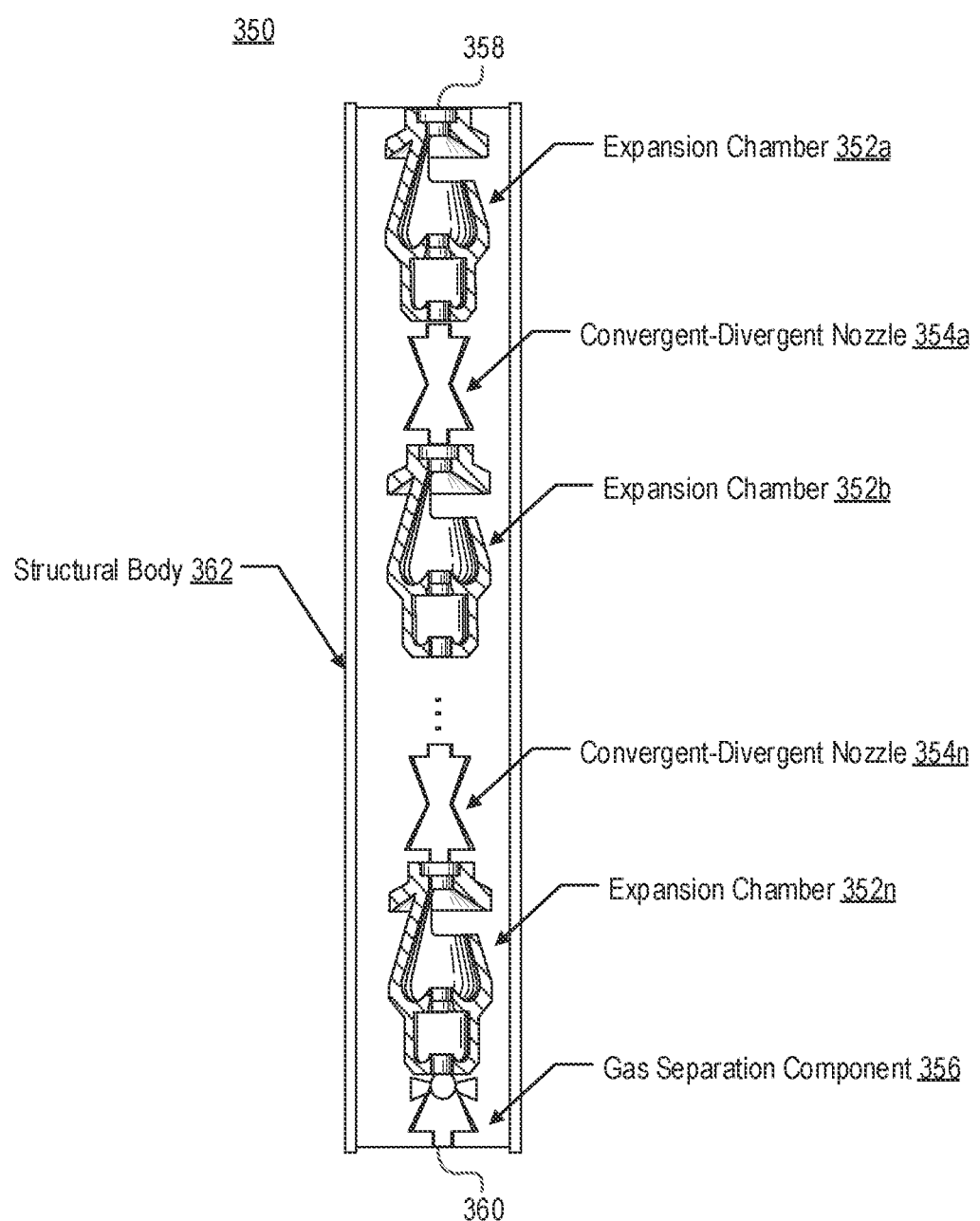

FIG. 3A illustrates an example of a hydromagnetic resonator 300 that is capable of magnetically treating water, while FIG. 3B illustrates another example of a hydromagnetic resonator 350 that is capable of magnetically treating water. Those skilled in the art will recognize that the magnetically treated water could be deposited into a series of containers for resale purposes, or the magnetically treated water could be used in a production operation (e.g., for a food, beverage, cleaning product, beauty products, etc.) for which water is needed.

As shown in FIG. 3A, the hydromagnetic resonator 300 may include one or more convergent-divergent nozzles 304a-n that are arranged in series between a pair of expansion chambers 302a-b. In such a configuration, water received by the hydromagnetic resonator 300 through an ingress interface 308 is guided from a first expansion chamber 302a to a second expansion chamber 302b through the convergent-divergent nozzles 304a-n. Alternatively, the hydromagnetic resonator 350 may include multiple expansion chambers 352a-n and multiple convergent-divergent nozzles 354a-n that are alternatively arranged as shown in FIG. 3B. In such a configuration, water received by the hydromagnetic resonator 350 through an ingress interface 358 is guided through at least two pairs of expansion chambers and convergent-divergent nozzles.

In some embodiments, the hydromagnetic resonator 300, 350 includes a gas separation component 306, 356 designed to remove at least some gas from the water prior to being expelled from an egress interface 310, 360. The gas may be, for example, air. Some of this gas may be introduced into the water as it jostles itself traveling through the expansion chambers 302a-b, 352a-n or the convergent-divergent nozzles, 304a-n, 354a-n. Examples of gas separation components include relief valves and degassing chambers, such as vacuum chambers. The type of gas separation component included in a given hydromagnetic resonator may depend on factors such as the amount of gas to be removed from the water and the speed with which the gas is to be removed from the water. This speed may correspond to the speed with which the water is traveling through the hydromagnetic resonator.

The expansion chambers, convergent-divergent nozzles, and gas separation component may be installed within a structural body 312, 362. The structural body (also referred to as a "durable housing") 312, 362 may be a hollow cylinder (also referred to as a "sleeve") that is comprised of metal, ceramic, or plastic. The structural body 312, 362 may enable the hydromagnetic resonator 300, 350 to be easily installed within a treatment system. For example, the structural body 312, 362 may include a first threaded end at the ingress interface 308, 358 and/or a second threaded end at the egress interface 310, 360. Generally, the first threaded end engages a first pipe through which water is supplied to the hydromagnetic resonator 300, 350 while the second threaded end engages a second pipe through which water is expelled from the hydromagnetic resonator 300, 350. Thus, the second pipe may carry water away from the hydromagnetic resonator 300, 350 toward a next component in the treat process. Alternatively, the second pipe may simply carry water away from the hydromagnetic resonator 300, 350 toward a holding tank in which treated water is stored.

Figure 4:
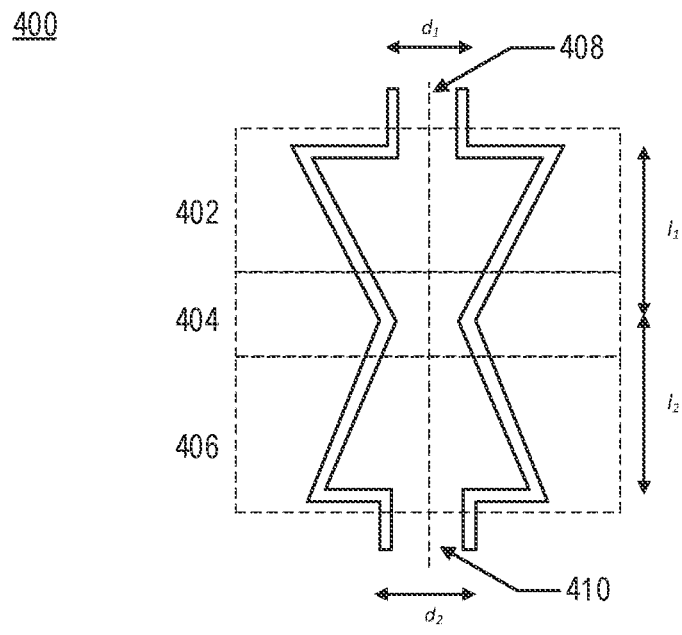
FIG. 4 illustrates how a convergent-divergent nozzle (also referred to as a "de Laval nozzle") may be designed to accelerate the flow of water as it passes from an inlet segment to an expansion segment through a throat segment.

FIG. 4 illustrates how a convergent-divergent nozzle (also referred to as a "de Laval nozzle") 400 may be designed to accelerate the flow of water as it passes from an inlet segment 402 to an expansion segment 406 through a throat segment 404. At a high level, the convergent-divergent nozzle 400 is a tube that is pinched in the middle so that fluid passing through it is accelerated in the axial direction. While the throat segment 404 is centrally located along the length of the convergent-divergent nozzle 400 shown in FIG. 4, the throat segment 404 may not be equidistant between the ingress interface 408 through which water is received and the egress interface 410 through which water is ejected. Instead, the convergent-divergent nozzle 400 normally has an hourglass shape because the throat segment 404 is slightly nearer the ingress interface 408 than the egress interface 410 and the diameter $(d_2)$ of the expansion segment 406 is slightly larger than the diameter $(d_1)$ of the inlet segment 402. Said another way, the length $(I_1)$ of the distance between the ingress interface 408 and throat segment 404 may be shorter than the length $(I_2)$ of the distance between the throat segment 404 and egress interface 410.

In the throat segment 404 where the cross-sectional area is at its minimum, the velocity of the water will increase—a condition referred to as "choked flow." As the cross-sectional area increases in the expansion segment 406, the water will begin to expand. In order for the water to "choke" at the throat segment 404, the pressure and flow through the convergent-divergent nozzle 400 must be sufficiently high. Accordingly, the pressure of the water entering the convergent-divergent nozzle 400 may be above the ambient pressure.

As discussed above, the number of convergent-divergent nozzles included in a hydromagnetic resonator may vary. For example, some embodiments of hydromagnetic resonator include a single convergent-divergent nozzle arranged between a pair of expansion chambers, while other embodiments of hydromagnetic resonator include multiple convergent-divergent nozzles (e.g., 3, 5, or 7) arranged in series between a pair of expansion chambers. Alternatively, convergent-divergent nozzles could be alternatively arranged with expansion chambers as shown in FIG. 3B.

The thickness of the wall defining the inlet segment 402, throat segment 404, and expansion segment 406 may be based on the pressure of the water inside each segment. As such, the thicknesses may vary based on characteristics of the water (e.g., its viscosity, temperature, etc.), the flow rate, etc. Meanwhile, in the central portions of the inlet and expansion segments 402, 406, micro-cluster explosions will occur as discussed above. Accordingly, degassing may occur within the convergent-divergent nozzle 400 as gasses dissolved within the water are released.

Within the convergent-divergent nozzle 400, magnetic induction may increase in the flow direction. For instance, the magnetic induction may be 45-60 millitesla near the entrance of the inlet segment 402 and 120 millitesla near the throat segment 404. Consequently, there may be constant spasmodic variation in magnetic induction as water travels through a hydromagnetic resonator. This may greatly enhance the effect of magnetostriction.

As further discussed below, permanent magnets are normally located in the expansion chamber(s) of a hydromagnetic resonator. However, in some embodiments, permanent magnets may also be located in the convergent-divergent nozzles. For example, permanent magnets may be arranged along the perimeter of a convergent-divergent nozzle proximate to the inlet segment, throat segment, expansion segment, or any combination thereof.

Figure 5:
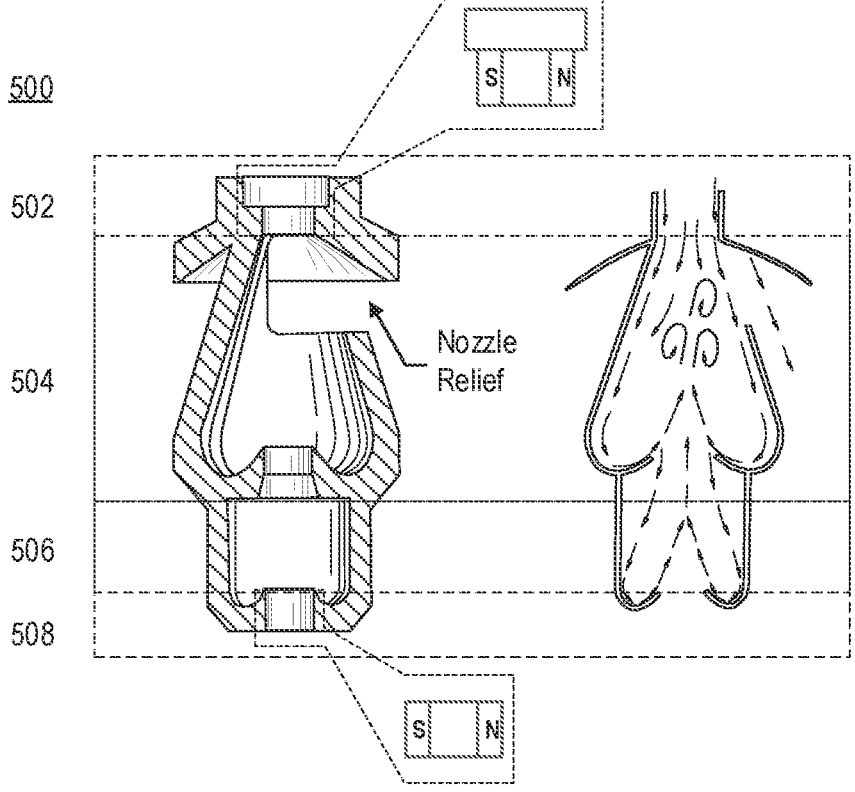
FIG. 5 illustrates how an expansion chamber can provide a tortuous path along which water is able to flow through a magnetic field created by an arrangement of permanent magnets.

FIG. 5 illustrates how an expansion chamber 500 can provide a tortuous path along which water is able to flow through a magnetic field created by an arrangement of permanent magnets. As shown in FIG. 5, the expansion chamber 500 may include an inlet segment 502, a primary expansion segment 504, a secondary expansion segment 506, and an outlet segment 508. As shown in FIG. 5, these segments define the tortuous path along which water will travel as it flows through the expansion chamber 500.

Because the expansion chamber includes one or more arrangements of permanent magnets that creates a magnetic field, the water will be magnetically treated as it travels along this tortuous path. Here, for example, a first arrangement of permanent magnets is located in the inlet segment 502 and a second arrangement of permanent magnetics is located in to the outlet segment 508. Alternatively, the first arrangement of permanent magnets may be located in a structural body (also referred to as a "sleeve") that can be threadably engaged with the inlet segment 502. Similarly, the second arrangement of permanent magnets may be located in a sleeve that can be threadably engaged with the outlet segment 508. In some embodiments the first and second arrangements of permanent magnets are identical, while in other embodiments the first and second arrangement of permanent magnets are different. While the expansion chamber 500 shown in FIG. 5 includes multiple arrangements of permanent magnets, other embodiments of the expansion chamber 500 may include a single arrangement of permanent magnets. In such a scenario, the single arrangement of permanent magnets could be positioned proximate to either the inlet segment 502 or outlet segment 508.

Note that the expansion chambers included in a hydromagnetic resonator do not necessarily need to include identical arrangements of permanent magnets. For instance, a hydromagnetic resonator may include a first expansion chamber that provides a first tortuous path through a first magnetic field created by a first arrangement of permanent magnets and a second expansion chamber that provides a second tortuous path through a second magnetic field created by a second arrangement of permanent magnets different than the first arrangement of permanent magnets. Each arrangement of permanent magnets may be designed based on the desired magnetic field, which may in turn be based on characteristics of the water to be treated. These characteristics may include the speed, pressure, viscosity, or temperature of the water. Accordingly, an expansion chamber included in a hydromagnetic resonator that is responsible for treating water traveling at one speed may include a different arrangement of permanent magnets than an expansion chamber included in a hydromagnetic resonator that is responsible for treating water traveling at another speed. Similarly, an expansion chamber included in a hydromagnetic resonator that is responsible for treating water at one pressure may include a different arrangement of permanent magnets than an expansion chamber included in a hydromagnetic resonator that is responsible for treating water at another pressure.

One or more blades may be located near the inlet segment 502 and/or the outlet segment 508 to ensure that water travels in a particular direction as it travels through the expansion chamber 500. These blade(s) may be designed to ensure that the water travels in a clockwise direction with respect to the median plane that divides the expansion chamber 500 lengthwise. In some embodiments, the blade(s) are integrally formed within the inlet segment 502 and/or the outlet segment 508 of the expansion chamber 500. Alternatively, these blade(s) may be part of a separate component that is secured, for example, to the inlet segment 502 of the expansion chamber 500.

FIG. 6 depicts several examples of degassing components (also referred to as "gas separation components") 600*a-b* able to remove at least some gas from the water as it travels through a hydromagnetic resonator. As discussed above, micro-cluster explosions that create gas may occur as the water travels through a convergent-divergent nozzle (e.g., convergent-divergent nozzle 400 of FIG. 4), and a degassing component may be useful in removing at least some of this gas before the water is expelled from the hydromagnetic resonator. Normally, a single degassing component is located near the egress interface of the hydromagnetic resonator as shown in FIGS. 3A-B. However, some embodiments of the hydromagnetic resonator include multiple degassing components. For example, degassing components could be interspersed in the alternating series of expansion chambers and convergent-divergent nozzles shown in FIG. 3B.

One example of a degassing component is a gas relief valve (also referred to as a "pressure relief valve" or "relief valve") designed to protect against overpressure by discharging pressurized gases through an auxiliary passage out of the hydromagnetic resonator. Generally, the relief valve is designed to open at a predetermined pressure to protect downstream components from being subjected to pressures that exceed their design limits. When this pressure is exceeded, the relieve valve becomes the "path of least resistance" as the valve is forced open and gas is diverted through the auxiliary route. Another example of a degassing component is a degassing chamber, such as a vacuum chamber, that is connected to a vacuum pump able to remove gas from water in the chamber. The chamber may be sealed with a lid comprised of a shatter-resistant material and rubber gasket that collectively create an air-tight seal for maximum vacuum.

FIGS. 7A-B and 8A-B depict examples of hydromagnetic resonators having different form factors. As discussed above, these hydromagnetic resonators can be deployed as in-line systems capable of treating water as it travels from a source to a destination. For example, a hydromagnetic resonator may be deployed such that water is treated before being deposited into receptacles (e.g., plastic containers such as jugs or bottles) intended for resale, or a hydromagnetic resonator may be deployed such that water is treated before being used in the production of foodstuffs, beverages, or another product (e.g., cleaning products, beauty products, etc.).

Figures 8A, 8B:
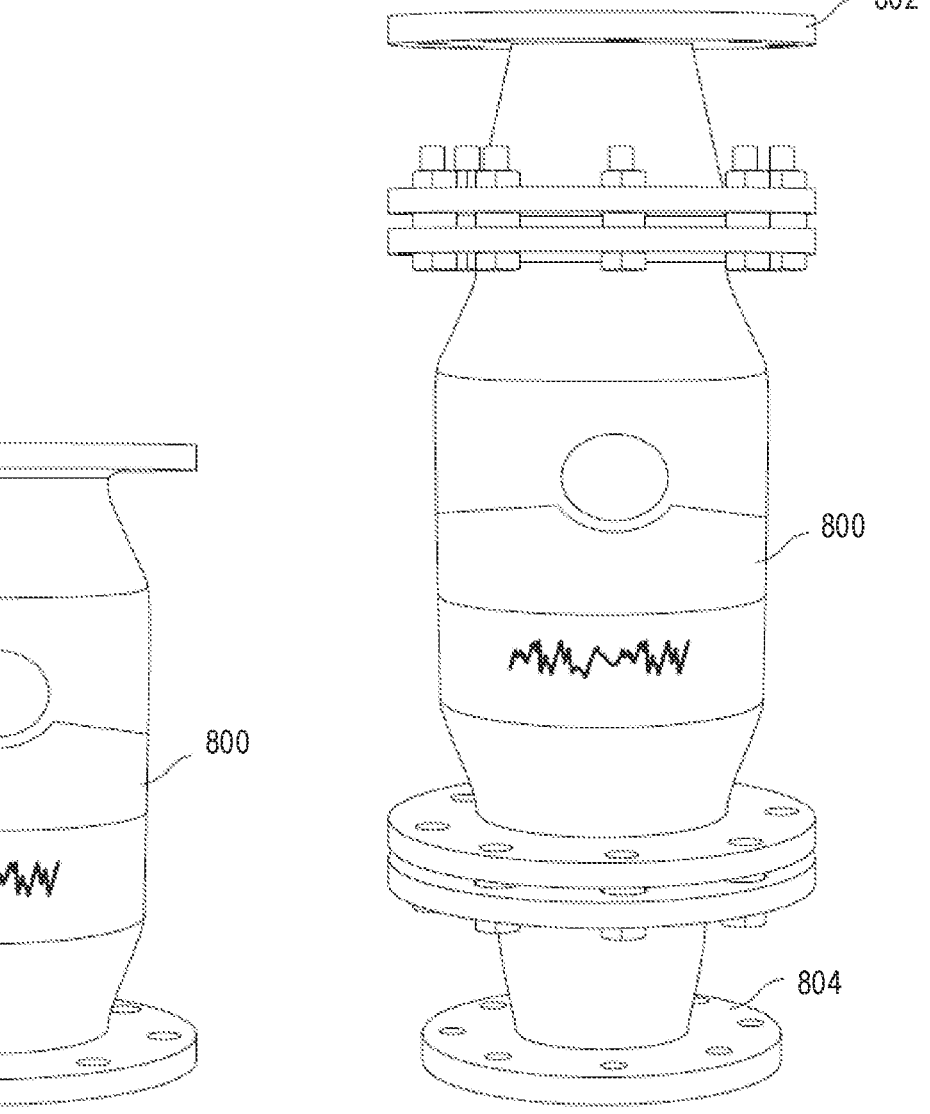
FIG. 8A depicts an example of a hydromagnetic resonator having a wide form.
FIG. 8B illustrates how the hydromagnetic resonator of FIG. 8A may be connected between an ingress pipe through which untreated water is received and an egress pipe through which treated water is ejected.

Here, FIG. 7A depicts an example of a hydromagnetic resonator 700 having a narrow form, while FIG. 7B illustrates how the hydromagnetic resonator 700 may be connected between an ingress pipe 702 through which untreated water is received and an egress pipe 704 through which treated water is expelled. FIG. 8A, meanwhile, depicts an example of a hydromagnetic resonator 800 having a wide form, while FIG. 8B illustrates how the hydromagnetic resonator 800 may be connected between an ingress pipe 802 through which untreated water is received and an egress pipe 804 through which treated water is expelled. The term "narrow form" may refer to hydromagnetic resonators having a diameter less than 6 inches, while the term "wide form" may refer to hydromagnetic resonators having a diameter greater than 6 inches. Generally the diameter of the hydromagnetic resonator is 4-8 inches, though the diameter may be based on the volume of fluid to be handled per unit time (e.g., per minute). The term "pipe" can refer to any tubular structure capable of conveying a fluid such as water. Generally, pipes are comprised of metal plastic, or some other non-degradable material that is unlikely to contaminate the fluid flowing therethrough.

The hydromagnetic resonator (and the other components shown in FIGS. 7B and 8B) may be designed based on how the treated water will be used. For example, an installer may choose which hydromagnetic resonator should be employed based on the size of the pipeline through which water will be delivered to the hydromagnetic resonator for treatment. Moreover, the form of a hydromagnetic resonator may depend on the volume, pressure, or temperature of water to be treated. For example, hydromagnetic resonators designed to treat smaller volumes of water on a per-minute basis may have a narrower form than hydromagnetic resonators designed to treat larger volumes of water on a per-minute basis, as shown in FIGS. 7A-B and 8A-B respectively. As another example, a bottler who intends to sell treated water that is sealed in containers may employ a different hydromagnetic resonator than a producer who intends to use the treated water in the production of foodstuffs, beverages, or other products (e.g., cleaning products, beauty products, etc.).

Degassing Via Magnetic Field

Water in contact with atmospheric air represents an open nonhomogeneous system in which the atmospheric air will dissolve in the water in an inconsistent manner. Part of the dissolved air will form a colloid of microbubbles in the water. These bubbles are thermodynamically metastable due to the adsorption of ions on their surface. Generally, these bubbles are formed as temperature fluctuations affect the density of the water. The hydrophobicity of the atmospheric air creates high surface tension and Laplace pressure, and the adsorption of ions creates a back pressure that stabilizes the size of the bubbles. Ultimately, the bubbles may act as traps for ions suspended in the water.

The basic properties of water can be altered through degassing as a result of magnetic treatment as discussed above. When water is passed through a hydromagnetic resonator (e.g., hydromagnetic resonators 300, 350 of FIGS. 3A-B), instantaneous degassing will occur. Such degassing will lead to a second-order phase transition that alters properties of the water. For instance, water may experience:

A decrease in viscosity by 3-4 percent;
An increase in surface tension by 10-13 percent;
An increase in electrical conductivity by 7-26 percent;
An increase in specific heat capacity by 3-4 percent;
An increase in latent heat of vaporization by 10-40 percent;
An increase in magnetic susceptibility by 200-400 percent; and/or
A decrease in pathogenic bacteria activity by 2-4 times.

Assume, for example, that a bottler is interested in selling treated water that is sealed in containers for consumption. To obtain the aforementioned benefits, a hydromagnetic resonator may be installed such that water is treated prior to delivery to a purification system, prior to delivery to a filtration system, prior to delivery to a filling system, or any combination thereof. Accordingly, more than one hydromagnetic resonator may be deployed within the bottler's facility. Meanwhile, if the treated water is intended for municipal use (e.g., in a facility such as a home, apartment, or business), then a hydromagnetic resonator could be installed directly onto the pumping equipment in those facilities. For example, a hydromagnetic resonator could be installed on the pipe through which water is delivered to a sink. In this scenario, a separate hydromagnetic resonator may be deployed for each sink for which treated water is desired. As another example, a hydromagnetic resonator could be installed on the pipe responsible for delivering water to a building, in which case each sink does not need to have a separate hydromagnetic resonator.

Research has shown that magnetically treating water may result in several benefits. With respect to untreated water, treated water has been shown to:

Inhibit the formation of mineral deposits on surfaces with which it comes into contact;
Require less energy for heating and vaporization;
Increase the service life of equipment (e.g., heating systems and pumping systems) with which the treated water comes into contact;

10

Have fewer organic impurities;
Suppress vital activity of pathogenic microorganisms, bacteria, and the like;
Have an increased deposition rate of suspended particulates;
Have an increased rate of adsorption;
Have an increased rate at which ion exchange processes occur;
Have an increased dynamic exchange capacity for ionites;
Permeate cellular membranes more rapidly;
Have an increased oxygen solubility and a decreased carbon dioxide solubility;
Result in fewer emissions of liquid and gaseous waste.

Research has also shown that treated water may have an anti-inflammatory effect that could stimulate the production of cytokines by the human body. For instance, a study in which treated water stimulated the production of cytokines by the human body, thereby mediating an enhanced immune response, is described by Maria Manuela Rosado et al. in "Immune-Modulating Perspectives for Low Frequency Electromagnetic Fields in Innate Immunity," while a study in which treated water influenced adaptive immune responses by inhibiting the primary immune response against bacterial infections is described by Fouad H. Kamel et al. in "Effect of Magnetic Water on Immune Response in Rabbit against pathogenic bacteria."

Evaluation of Efficiency when Pumping Water Through a Magnetic Field

Water under the influence of a magnetic field will experience detectable changes in characteristics such as density, viscosity, heat capacity, and specific heat of vaporization. Changes in these characteristics, especially density and viscosity, will affect the amount of power that is consumed by a pumping system (or simply a "pump") that is responsible for pumping the water. If a hydromagnetic resonator as described herein is designed to lower the density of water, then the total amount of energy consumed by pumps that handle treated water will be reduced.

To quantitatively assess the impact of treated water on efficiency, it may be useful to model characteristics of the treated water, a pump, and its electric drive. The density ($\rho$) of water is a physical quantity that is determined based on the mass of a unit volume in kilograms per cubic meter ($kg/m^3$). The density of water can be approximated based on the temperature (T) as follows:

$$\rho(T) = \frac{995.7}{0.984 + 0.483 \cdot 10^{-3} \cdot (T - 273)}. \qquad \text{Eq. 3}$$

The viscosity ($\mu$) of water is representative of its ability to resist shear. When water moves through a hydromagnetic resonator, the outermost layers will adhere to its inner surface while the remaining layers will slide relative to one another. The force required to overcome the slip of these layers is called the resistance of the medium. If there are no vortices during movement of the water, then the resistance of the medium is proportional to the speed of the movement. The coefficient of proportionality is the coefficient of internal friction, and this value is called the absolute viscosity. Absolute viscosity (also referred to as "dynamic viscosity" or simply "viscosity") is the product of the kinematic viscosity and density as shown below:

$$\mu = u \cdot \rho. \qquad \text{Eq. 4}$$

Generally, viscosity is expressed in units of Pascal-seconds (Pa·s). Kinematic viscosity (u) is a measure of the flow of a resistive fluid under the influence of gravity. When two fluids of equal volume are placed in identical capillary viscometers such that movement is driven by gravity, the viscous liquid will take longer to flow through the capillary. For example, if a first liquid takes 200 seconds to flow through the capillary while a second liquid takes 400 seconds to flow through the capillary, the second liquid is twice as viscous as the first liquid in terms of kinematic viscosity. Kinematic viscosity is expressed in units of square meters per second ($m^2/s$). The kinematic viscosity of water at a given temperature (T) can be modeled as follows:

$$u(T) = \frac{1.78 \cdot 10^{-6}}{\left[1 + 0.0337 \cdot (T - 273) + 0.000221 \cdot (T - 273)^2\right]}.$$ Eq. 5

Changes in the viscosity of water will impact power loss of the pump, disc friction, and hydraulic resistance to flow. In most scenarios, changes in viscosity have a much greater effect on the power loss than changes in density. When the viscosity of water decreases, the pump flow will typically increase.

Pump flow (also referred to as "capacity") is the amount of water that is moved by the pump per unit of time. Pump flow can be expressed as either volume flow (Q), which is expressed in cubic meters per second ($m^3/s$), or mass flow (G), which is expressed in kilograms per second (kg/s). As shown below, there is a relationship between the volume flow and mass flow:

$$Q=G/\rho,$$ Eq. 6 where $\rho$ is the density of the pumped fluid. The flow of the pump will depend on its design, the rotation speed of the impeller, the viscosity of the fluid, and the characteristics of the pipeline through which the pump moves the fluid.

Pump head (H) is the energy that a volume of fluid weighing one Newton receives as it passes through the pump. Pump head is expressed in meters (m) of the column of working (i.e., pumped) fluid. Pump head can also be considered from a geometric point of view as the height to which one Newton of fluid would be raised due to the energy generated by the pump. Note that the pressure characteristic of the pump does not normally depend on the density of the fluid but instead depends on the viscosity of the fluid. Accordingly, the pressure characteristic may only be attained by testing the fluid in conjunction with a real pump.

Net power ($N_n$) is the energy given to a fluid per unit of time during operation of the pump. Net power is measured in watts and can be modeled as follows:

$$N_n=Q \cdot \rho \cdot g \cdot H,$$ Eq. 7 where g is the acceleration of gravity in meters per seconds squared ($m/s^2$).

The total efficiency of the pump ($\eta_{pum.}$) is the ratio of net power to the power on the shaft as shown below:

$$\eta_{pum.} = \frac{N_n}{N_{sh.}}.$$ Eq. 8

Shaft power ($N_{sh}$) is the energy that is consumed by the pump per unit time. In other words, the power on the shaft is the energy transferred to the impeller shaft of the pump from an electronic drive that controls the motor responsible for driving the pump. The power on the shaft is an important parameter that gives an idea of the energy consumption of the pump while operating. However, the parameter itself has limited usefulness. Therefore, one purpose of the modeling may be to estimate the power consumption of the pump when the density/viscosity of the pumped fluid changes.

Generally, the useful power on the shaft (P) will be shown on the nameplates of motors. The power consumed by a motor can be found based on parameters such as the motor efficiency ($\eta_{am}$) and cos $\varphi$. Generally, it is necessary to take into account the relationship between the useful power on the shaft and the specified efficiency. Using these values, it is possible to model the active power ($P_a$) that the motor actually consumes as shown below:

$$P_a = \frac{P}{\eta_{am}}.$$ Eq. 9

Now, it may be useful to take into account the fact that, in general, electrical devices consume not only active energy but also reactive energy. The motor that drives the pump is no exception. We can model the full power (S) consumed by the motor as follows:

$$s = \frac{P_a}{\cos \varphi} = \frac{P}{\eta_{am} \cdot \cos \varphi},$$ Eq. 10 where P is the useful power on the shaft, $\eta_{am}$ is the efficiency of the motor, and $\varphi$ is the angle between the active and full power vectors. Taking into account the net power and total efficiency of the pump (and the fact that power on the shaft ($N_{sh.}$) is roughly equal to the useful power on the shaft (P)), the above expression takes the following form:

$$s = \frac{Q \cdot \rho \cdot g \cdot H}{\eta_{pum} \cdot \eta_{am} \cdot \cos \varphi}.$$ Eq. 11

This formula provides a rough estimate of the impact that magnetically treating water will have on the energy consumption of the pump.

Use Case of Pump in Nominal Mode

Given a scenario with the following characteristics:

Active Power ($P_1$)=0.43 kW;
Useful Power on Shaft ($P_2$)=0.37 kW;
Consumption (Q)=0; 0.3; 0.6; 1.2; 1.8 $m^3/h$;
Pressure (N)=35; 31; 25; 14; 4 m;
Operating Range (Q)=0.6-1.5 $m^3/h$, H=10-20 m;
Pump Efficiency ($>\eta_p$)=0.86;
Efficiency of Motor ($\eta_{am}$)=0.73;
Power Factor (cos $\varphi$)=0.82; and
Pump Shaft Speed (n)=2900 rpm.

The full power (S) can be estimated as follows:

$$S = \frac{Q \cdot \rho \cdot g \cdot H}{\eta_p \cdot \eta_{am} \cdot \cos \varphi} = \frac{0.43}{0.82} = 0.52 \text{ kW}.$$ Eq. 12

Figure 9:
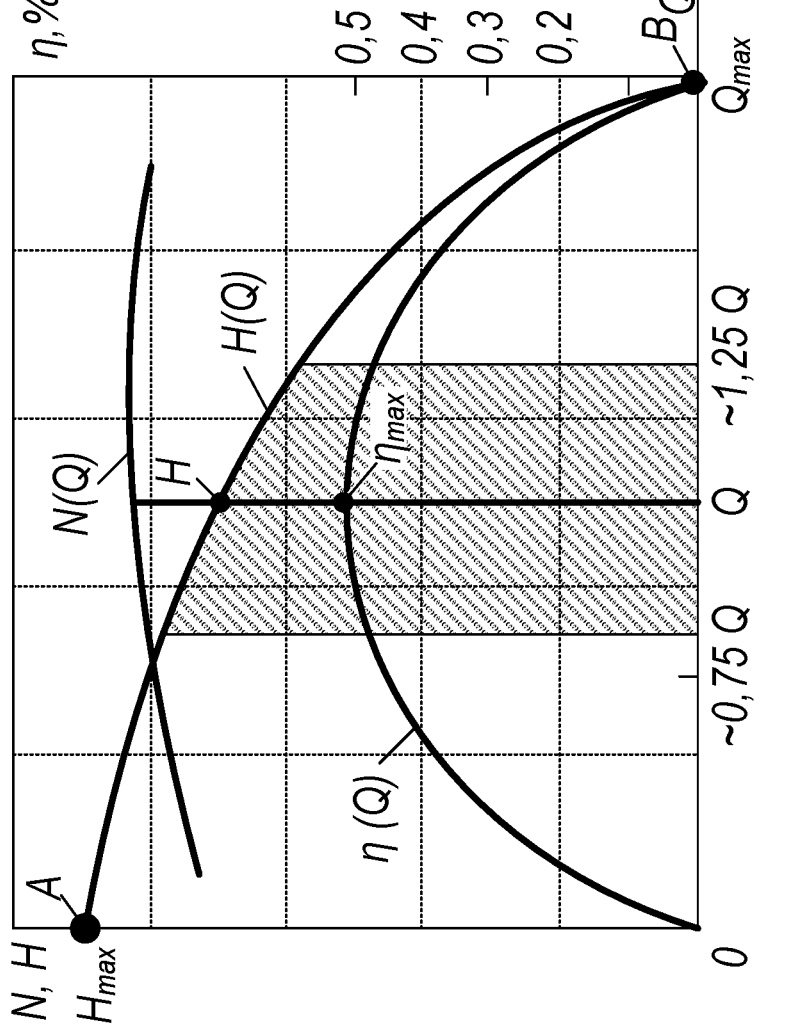
FIG. 9 includes a graphical representation of the mutual changes in the parameters of a pump and an electric drive responsible for pumping water.

Then, the degree of methodological error can be estimated. In this case, it is desirable to take into account the mutual change in the parameters of the pump and electric drive. A graphical representative of the change is shown in FIG. 9. As can be seen in FIG. 9, the nature of the dependencies is nonlinear even within the operating range of the pump. In order to simplify the calculations, average values may be generated for the entire range of changes. For example, such an approach may yield the following values:

Average Consumption $(Q_{avg})$=0.975 m³/h; =270.1·10⁻⁶ m³/s;

Average Pump Head $(H_{avg})$=21.8 m;

Average Pump Efficiency $(\eta_{p\ avg})$=0.4;

Average Efficiency of Motor $(\eta_{am\ avg})$=0.45;

Average Power Factor (cos φ)=0.78; and

Average Density (ρ)=998.2 kg/m³.

To estimate the total power consumption $(S_{P1})$ of the pump, these values can be substituted into the full power equation above, which yields:

$$S_{P1} = \frac{270.1 \cdot 10^{-6} \cdot 998.2 \cdot 9.8 \cdot 21.8}{0.4 \cdot 0.45 \cdot 0.78} = 0.411 \text{ kW}. \qquad \text{Eq. 13}$$

By comparing these results, we can see that the methodological error does not exceed 21 percent. This results makes it possible to unambiguously ascertain the possible reduction of energy consumed by the pump—in this case, the electricity needed to pump water treated with a hydromagnetic resonator as described above. In other words, the actual power consumption $(S_M)$ of the pump during treatment can be estimated as follows:

$$S_M = S_p + 0.25 \cdot S. \qquad \text{Eq. 14}$$

In this formula, the coefficient (0.25) is the sum of the basic methodological error (0.21) and the additional methodological error (0.04) caused by the linear extrapolation method when calculating the Q-H characteristics of the pump due to the changing density of water.

The reduction in energy consumed by the pump can be evaluated using these formulas. The influence of magnetic treatment may be taken into account by reducing the density of water by roughly 5-7 percent and then recalculating the Q-H characteristics. Following recalculation, the following parameters were obtained:

Consumption (Q)=261.3·10⁻⁶ m³/s;

Pump Head (H)=23 m;

Pump Efficiency $(\eta_p)$=0.47;

Efficiency of Motor $(\eta_{am})$=0.52;

Power Factor (cos φ)=0.8; and

Density (ρ)=948.29 kg/m³.

Accordingly, the full power was estimated as follows:

$$S_{P2} = \frac{261.310^{-6} \cdot 948.29 \cdot 23 \cdot 9.8}{0.47 \cdot 0.52 \cdot 0.8} = 0.286 \text{ kW}. \qquad \text{Eq. 15}$$

And then the actual power consumption was estimated as follows:

$$S_M = S_{p2} + 0.25 \cdot S = 0.286 + 0.25 \cdot 0.52 = 0.416 \text{ kW}. \qquad \text{Eq. 16}$$

Thus, each one-percent reduction in the density of water results in a savings of approximately 4 to 5 percent of the total electricity consumed by a pump. Since the hydromagnetic resonators described herein have been shown to reduce the density of water by nearly 5 percent, the pump may consume approximately 20 to 25 percent less electricity.

Methodologies for Magnetically Treating Water

FIG. 10 depicts a flow diagram of a process 1000 for constructing a hydromagnetic resonator designed to magnetically treat fluid flowing therethrough. The process 1000 could be performed by a "manufacturer," who may be either an entity (e.g., via automation) or an individual. Initially, a manufacturer can acquire at least one convergent-divergent nozzle (step 1001). Each convergent-divergent nozzle may be designed to accelerate the flow of fluid passing from an inlet segment to an expansion segment through a throat segment. The manufacturer can also acquire a first expansion chamber that provides a tortuous path through a first magnetic field created by a first arrangement of permanent magnets (step 1002) and a second expansion chamber that provides a tortuous path through a second magnetic field created by a second arrangement of permanent magnets (step 1003). Generally, the first and second arrangements of permanent magnets are designed based on a characteristic of the fluid that will flow through the hydromagnetic resonator. Examples of such characteristics include the desired viscosity, density, etc. Note, however, that the first and second arrangements of permanent magnets do not need to be identical to one another. Thus, the first arrangement of permanent magnets in the first expansion chamber may be different than the second arrangement of permanent magnets in the second expansion chamber. In such a scenario, the first magnetic field will be different than the second magnetic field.

Then, the manufacturer can secure the at least one convergent-divergent nozzle between the first and second expansion chambers (step 1004), so that fluid is able to flow from the first expansion chamber through the at least one convergent-divergent nozzle into the second expansion chamber. In some embodiments, the manufacturer may secure a degassing component to the second expansion chamber (step 1005). Such an approach may be desirable if gas (e.g., air) should be removed from the treated fluid prior to egress from the hydromagnetic resonator.

Moreover, the manufacturer may insert the first expansion chamber, the at least one convergent-divergent nozzle, the second expansion chamber, and the degassing component into a durable housing (step 1006). As discussed above, the durable housing may be in the form of a hollow cylinder that has a first threaded end through which fluid is received and/or a second threaded end through which fluid is ejected. Such a design enables the hydromagnetic resonator to be easily installed in existing infrastructure.

Those skilled in the art will recognize that these steps could be performed in various orders. For example, the aforementioned components could be sequentially installed within the durable housing rather than inserted as a group. As another example, some steps may be performed multiple times depending on the arrangement of expansion chambers and convergent-divergent nozzles. For instance, if the manufacturer is interested in constructing the hydromagnetic resonator shown in FIG. 3A, then the manufacturer will connect multiple convergent-divergent nozzles in series between the first and second expansion chambers. However, if the manufacturer is interested in constructing the hydromagnetic resonator shown in FIG. 3B, then the manufacturer will acquire at least three expansion chambers and at least two convergent-divergent nozzles so that those components can be alternately arranged within the durable housing.

Figure 11:
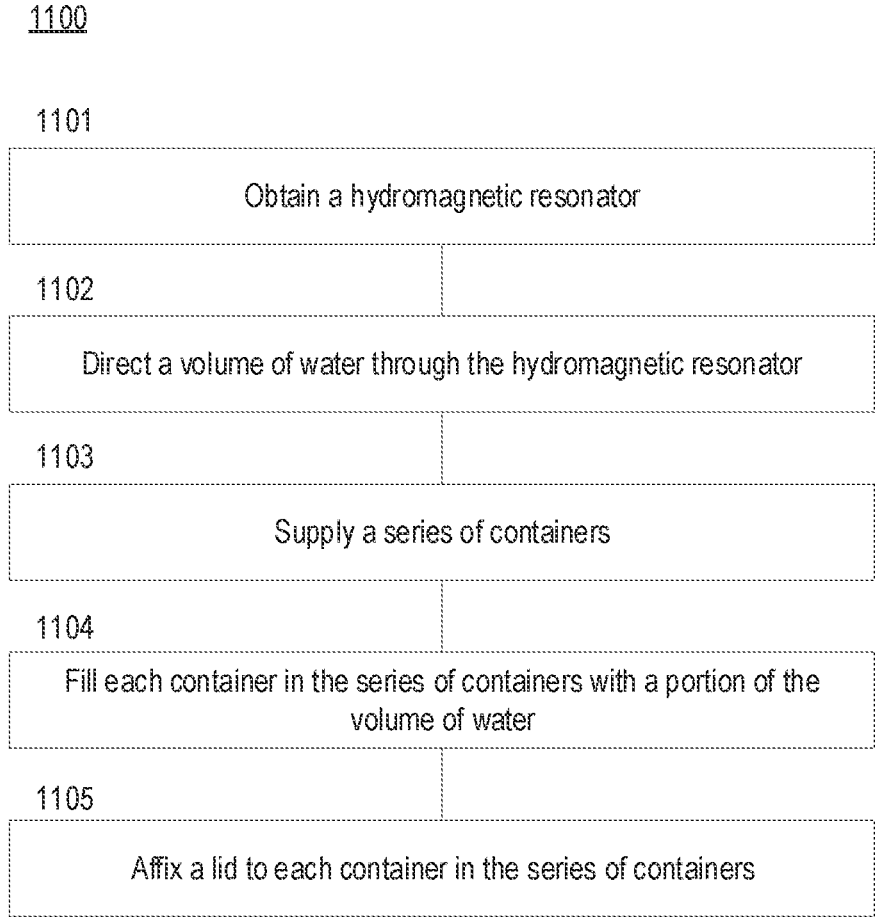
FIG. 11 depicts a flow diagram of a process for magnetically treating water with a hydromagnetic resonator.

FIG. 11 depicts a flow diagram of a process 1100 for magnetically treating water with a hydromagnetic resonator. The process 1100 could be performed by a "producer," who may be an entity or an individual. For example, an entity may deploy one or more hydromagnetic resonators throughout a bottling facility, or an individual may simply pour water through a hydromagnetic resonator as part of a treatment process. In that sense, a hydromagnetic resonator could be used similar to point-of-use filters that are used to filter unwanted substances from water.

Initially, the producer can obtain a hydromagnetic resonator (step 1101). The hydromagnetic resonator can include one or more expansion chambers, one or more convergent-divergent nozzles, and one or more degassing components. As discussed above, each expansion chamber may provide a tortuous path along which water is able to flow through a magnetic field created by an arrangement of permanent magnets. This tortuous path may be defined by blade(s) that are integrally formed within the expansion chamber.

Then, the producer can direct a volume of water through the hydromagnetic resonator (step 1102). This may be accomplished by installing the hydromagnetic resonator within a bottling facility or a treatment facility. For example, the producer may install the hydromagnetic resonator within a purification system such that the volume of water is routed through the hydromagnetic resonator as it travels from one stage (e.g., straining) to the next (e.g., filtering). As another example, this may be accomplished by connecting the hydromagnetic resonator to a pipe (e.g., within a bottling facility, treatment facility, home, apartment, or business) that supplies water. As mentioned above, this could also be accomplished by manually directing water through the hydromagnetic resonator, though this approach is generally not appropriate for larger volumes of water. For instance, an individual could dump a small volume (e.g., 8 fluid ounces, 12 fluid ounces, or 16.9 fluid ounces) of untreated water into the hydromagnetic resonator in order to produce treated water.

As noted above, the hydromagnetic resonator could be installed within a bottling facility or a treatment facility. As such, the producer may supply a series of containers (step 1103) and then fill each container in the series of containers with a portion of the volume of water (step 1104). For example, the producer could deposit treated water into containers having volumes of 12 fluid ounces (355 milliliters), 16.9 fluid ounces (500 milliliters), 51 fluid ounces (1509 milliliters), 640 fluid ounces (18,927 milliliters), etc. Thereafter, the producer may affix a lid to each container in the series of containers (step 1105).

Unless contrary to physical possibility, it is envisioned that the steps described above may be performed in various sequences and combinations. Thus, a producer may perform the process 1100 of FIG. 11 multiple times in order to magnetically treat the water, for example at different stages of a treatment process. For example, the water may be magnetically treated before purifying (e.g., straining or filtering), treating, bottling, or any combination thereof.

Other steps may also be included in some embodiments. For example, the producer may opt to introduce a flavoring agent, an electrolyte-laden solution, or a mineral-laden solution into the volume of water. This could be done before, during, or after the water is magnetically treated. As another example, the producer may opt to introduce carbonation into the volume of water. Again, this could be done before, during, or after the water is magnetically treated.

Figure 12:
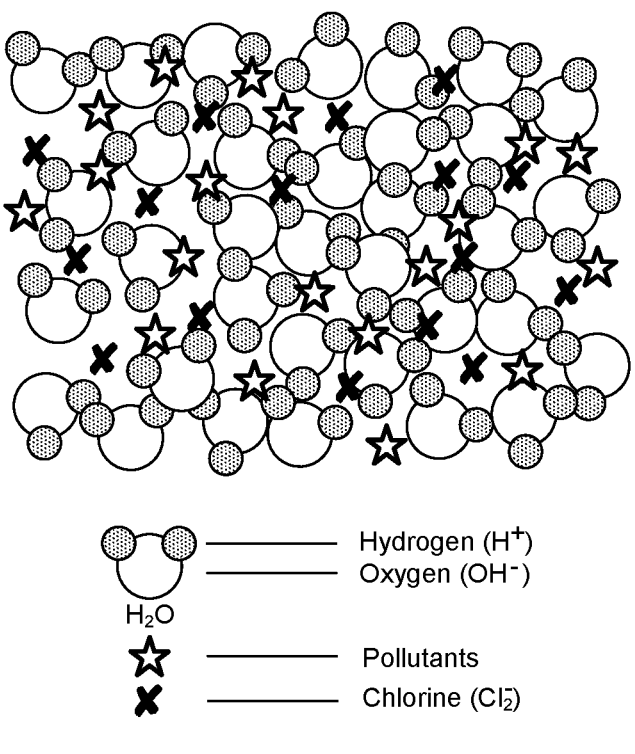
FIG. 12 illustrates how by the time water is ready for consumption, it may have an irregular structure that can be difficult for the human body to absorb.
Figure 13:
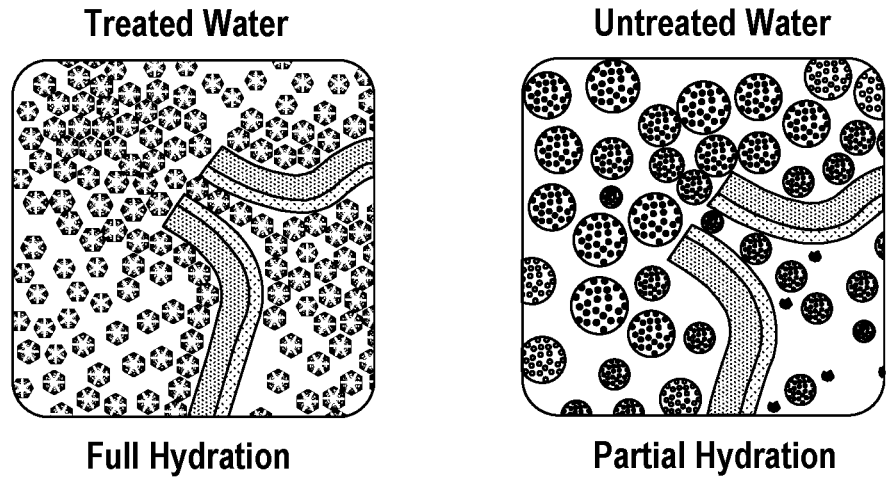
FIG. 13 illustrates how some clusters of molecules in untreated water may be too large to permeate the cellular membrane.

Water—regardless of whether it originates from a spring, tap, or bottle—is comprised of molecules that group together into clusters of various sizes. Generally, the structure of water is further damaged as it is treated with chemicals, exposed to extreme temperatures, and otherwise manipulated in order to make it safe to consume. FIG. 12 illustrates how by the time water is ready for consumption, it may have an irregular structure that can be difficult for the human body to absorb. For instance, some clusters of molecules may be too large to permeate the cellular membrane as shown in FIG. 13. If too many clusters of molecules are in this "larger" state, then the human body may experience a condition known as partial hydration even though sufficient amounts of water have been consumed.

By employing the approaches described herein, however, a higher percentage of water can be made available for absorption by the human body. For instance, treating a volume of water with a hydromagnetic resonator may cause the larger clusters of molecules to be rearranged into smaller, more uniformly sized clusters of molecules. Since these smaller, more uniformly sized clusters of molecules can be more readily absorbed by the human body, hydration can be improved without additives, chemicals, and the like.

Remarks

The foregoing description of embodiments has been provided for the purposes of illustration. It is not intended to be exhaustive, nor is it intended to limit the claimed subject matter to the precise forms disclosed. Many modifications and variations will be apparent to one skilled in the art. Embodiments were chosen in order to best describe the principles of the technology and its practical applications, thereby enabling those skilled in the relevant art to understand the technology, its various embodiments, and the various modifications that are suited to the particular uses contemplated.

Although various embodiments are described in the Detailed Description, the technology can be practiced in many ways, no matter how detailed the Detailed Description appears. Embodiments may vary considerably in their implementation, while still being encompassed by the present disclosure. Terminology that is used when describing characteristics, features, or aspects of various embodiments should not be taken to imply that the terminology is being redefined herein to be restricted to any specific characteristics, features, or aspects of the technology with which that terminology is associated. In general, the terms used in the claims should not be construed to limit the technology to specific embodiments, unless those terms are explicitly defined herein. Accordingly, the actual scope of the present disclosure encompasses not only the embodiments disclosed in the Detailed Description, but also all equivalent ways of practicing or implementing the embodiments.

The language used in the Detailed Description has been principally selected for readability and instructional purposes. It may not have been selected to delineate or circumscribe the subject matter. It is therefore intended that the scope of the technology be limited not by the Detailed Description, but rather by any claims that issue on an application based hereon. Accordingly, the disclosure of various embodiments is intended to be illustrative, but not limiting, of the scope of the technology as set forth in the following claims.

What is claimed is:

1. A method for constructing a hydromagnetic resonator designed to magnetically treat fluid flowing therethrough, the method comprising:

acquiring at least one convergent-divergent nozzle designed to accelerate a flow of fluid passing through a throat segment into an expansion segment;

acquiring a first expansion chamber providing a first tortuous path through a first magnetic field created by a first arrangement of permanent magnets;

acquiring a second expansion chamber providing a second tortuous path through a second magnetic field created by a second arrangement of permanent magnets;

securing the at least one convergent-divergent nozzle between the first and second expansion chambers such that fluid is able to flow from the first expansion chamber through the at least one convergent-divergent nozzle into the second expansion chamber; and inserting the first expansion chamber, the at least one convergent-divergent nozzle, and the second expansion chamber into a durable housing.

2. The method of claim 1, wherein the first arrangement of permanent magnets is different than the second arrangement of permanent magnets.

3. The method of claim 1, wherein the first tortuous path is defined by at least one blade located in the first expansion chamber, and wherein the second tortuous path is defined by at least one blade located in the second expansion chamber.

4. The method of claim 1, further comprising:

securing a degassing component to the second expansion chamber so that at least some gas is removed from fluid prior to egress from the hydromagnetic resonator.

5. The method of claim 1, wherein the durable housing is in the form of a hollow cylinder having a first threaded end through which fluid is received by the hydromagnetic resonator and a second threaded end through which fluid is expelled by the hydromagnetic resonator.

6. The method of claim 1, wherein the durable housing is in the form of a hollow cylinder having a threaded end through which fluid is received by the hydromagnetic resonator.

7. The method of claim 1, wherein the first and second arrangements of permanent magnets are based on a characteristic of the fluid.

8. The method of claim 1, further comprising:

acquiring a third expansion chamber that provides a third tortuous path through a third magnetic field created by a third arrangement of permanent magnets.

9. The method of claim 1, further comprising:

installing the hydromagnetic resonator such that a volume of water is directed through the hydromagnetic resonator;

supplying a series of containers with the volume of water;

filling each container in the series of containers with a portion of water; and affixing a lid to each container in the series of containers.

10. The method of claim 9, further comprising:

introducing a flavoring agent into the volume of water.

11. The method of claim 9, further comprising:

introducing carbonation into the volume of water.

\* \* \* \* \*